United States Patent
Gmirya

(10) Patent No.: US 12,416,354 B2
(45) Date of Patent: Sep. 16, 2025

(54) LUBRICATION SYSTEM

(71) Applicant: Lockheed Martin Corporation, Bethesda, MD (US)

(72) Inventor: Yuriy Gmirya, Woodbridge, CT (US)

(73) Assignee: Lockheed Martin Corporation, Bethesda, MD (US)

( * ) Notice: Subject to any disclaimer, the term of this patent is extended or adjusted under 35 U.S.C. 154(b) by 228 days.

(21) Appl. No.: 17/983,218

(22) Filed: Nov. 8, 2022

(65) Prior Publication Data

US 2024/0151302 A1    May 9, 2024

(51) Int. Cl.
*B64D 35/00*    (2006.01)
*F16H 57/04*    (2010.01)
*B64C 27/00*    (2006.01)

(52) U.S. Cl.
CPC ......... *F16H 57/0442* (2013.01); *B64D 35/00* (2013.01); *F16H 57/0406* (2013.01); *F16H 57/0423* (2013.01); *F16H 57/0436* (2013.01); *F16H 57/045* (2013.01); *F16H 57/046* (2013.01); *F16H 57/0465* (2013.01); *B64C 27/00* (2013.01)

(58) Field of Classification Search
CPC ............... F16H 57/0442; F16H 57/045; F16H 57/0424; F16H 57/0406; B64D 35/00
See application file for complete search history.

(56) References Cited

U.S. PATENT DOCUMENTS

| 8,793,871 | B2 * | 8/2014 | Morrison | F01D 25/12 29/897 |
| 8,931,358 | B2 * | 1/2015 | Chang | F16H 25/2214 74/89.3 |
| 10,077,664 | B2 | 9/2018 | Clum et al. | |
| 10,247,296 | B2 | 4/2019 | van der Merwe et al. | |
| 11,511,876 | B2 * | 11/2022 | Mueller | B64D 35/00 |
| 2020/0103019 | A1 | 4/2020 | Manzoni et al. | |
| 2020/0141482 | A1 | 5/2020 | Plasse | |
| 2020/0172260 | A1 | 6/2020 | Mueller et al. | |
| 2021/0140532 | A1 | 5/2021 | Farnum | |

FOREIGN PATENT DOCUMENTS

DE    19615889 A1    10/1997

OTHER PUBLICATIONS

Extended European Search Report for Application No. 23207548.1 dated Mar. 28, 2024 (9 pages).

* cited by examiner

*Primary Examiner* — Brian M O'Hara
(74) *Attorney, Agent, or Firm* — Michael Best & Friedrich LLP

(57) ABSTRACT

A gearbox includes a housing defining an interior. The housing includes outer walls and inner walls defining other structure within the housing, and at least one wall of the housing includes a semi-hollow volume. A main lubricant reservoir is disposed within the interior of the housing, and at least one pump is arranged in the interior of the housing for pumping lubricant from the main lubricant reservoir and distributing the lubricant throughout the housing. The semi-hollow volume of the at least one wall stores lubricant during normal operation of the pump, and when a loss of lubricant occurs within the housing, lubricant seeps from the semi-hollow volume to distribute lubricant throughout the housing.

20 Claims, 4 Drawing Sheets

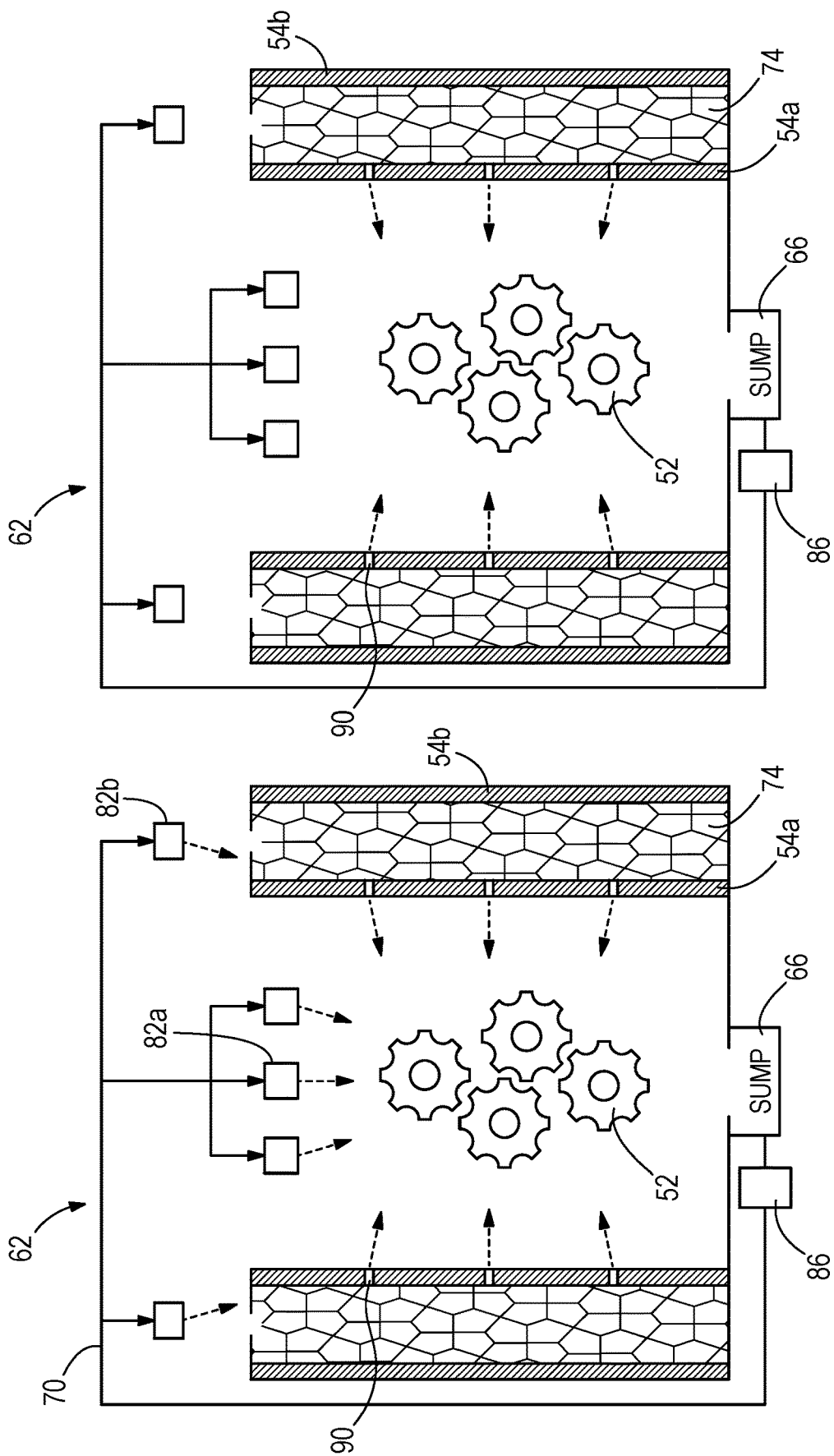

LUBRICATION SYSTEM

FIELD OF INVENTION

Exemplary embodiments relate to the art of rotary wing aircraft, and more particularly, to a lubricant storage system formed in a housing of a rotor system gearbox.

BACKGROUND

In a typical rotary wing aircraft, such as a helicopter for example, a main rotor system converts driveshaft rotary power into the aerodynamic forces necessary to generate lift. Lubrication systems supply lubricant to various components of a gearbox of the main rotor system to prevent overheating of said components. Current lubrication systems include housing and fitting connections that can leak and render the lubrication systems inoperative.

SUMMARY

In one aspect, the disclosure provides a gearbox including a housing defining an interior, the housing including outer walls and inner walls defining other structure within the housing, at least one wall of the housing including a semi-hollow volume. A main lubricant reservoir is disposed within the interior of the housing, and at least one pump is arranged in the interior of the housing for pumping lubricant from the main reservoir and distributing the lubricant throughout the housing. The semi-hollow volume of the at least one wall stores lubricant during normal operation of the pump, and when a loss of lubricant occurs within the housing, lubricant seeps from the semi-hollow volume to distribute lubricant throughout the housing.

In another aspect, the disclosure provides a lubrication system for a gearbox assembly, the lubrication system including a gearbox housing defining an interior, the gearbox housing including outer walls and inner walls defining other structure within the gearbox housing, wherein at least one wall of the gearbox housing includes a semi-hollow volume. The gearbox housing further includes a sump that stores lubricant. A transmission element is disposed within the interior of the housing, and the transmission element receives and is lubricated by the lubricant. During normal operation of the lubrication system, lubricant is pumped from the sump and distributed to the transmission element, and lubricant is stored in the semi-hollow volume of the at least one wall. During emergency operation of the lubrication system, lubricant seeps from the semi-hollow volume to distribute lubricant to the transmission element.

In another aspect, the disclosure provides an aircraft comprising a body, a prime mover supported by the body, a rotary assembly supported by the body, and a gearbox mechanically connected between the prime mover and the rotary assembly. The gearbox includes a housing including a plurality of walls, wherein at least one of the plurality of walls includes a semi-hollow volume, a main lubricant reservoir, and at least one pump arranged in the interior of the housing for pumping lubricant from the main lubricant reservoir and distributing lubricant throughout the housing. The semi-hollow volume of the at least one wall stores lubricant during a normal operating condition of the at least one pump. During an emergency operating condition, lubricant seeps from the semi-hollow volume to distribute lubricant throughout the housing.

Other aspects and embodiments will become apparent by consideration of the detailed description and accompanying drawings.

BRIEF DESCRIPTION OF THE DRAWINGS

FIG. 4A is a schematic view of a lubrication system for the gearbox of FIG. 2 during normal operation.

FIG. 4B is a schematic view of the lubrication system for the gearbox of FIG. 2 during emergency operation.

DETAILED DESCRIPTION

Before any embodiments are explained in detail, it is to be understood that the disclosure is not intended to be limited in its application to the details of construction and the arrangement of components set forth in the following description or illustrated in the following drawings. Embodiments are capable of other configurations and of being practiced or of being carried out in various ways.

Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and may include electrical connections or couplings, whether direct or indirect. Also, electronic communications and notifications may be performed using any known means including direct connections, wireless connections, and the like.

Figure 1:
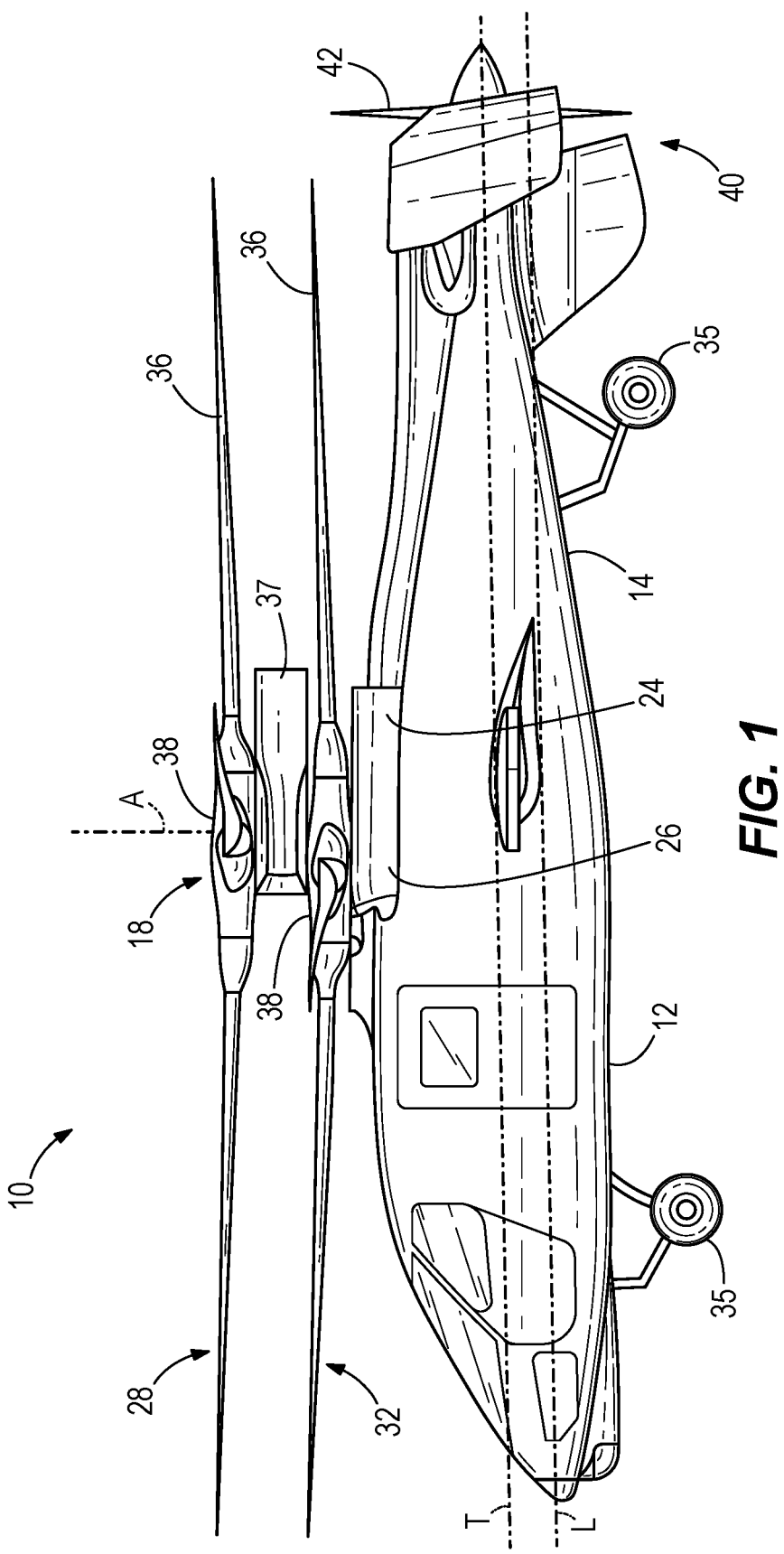
FIG. 1 is a side view of a rotary wing aircraft according to an embodiment of the disclosure.

Referring now to the figures, FIG. 1 depicts an embodiment of a rotary wing, vertical takeoff and landing (VTOL) aircraft 10. The aircraft 10 includes an airframe 12, or a body, with an extending tail 14. A dual, counter rotating, coaxial main rotor assembly 18 is located at the airframe 12 and rotates about a main rotor axis, A. The main rotor assembly 18 is driven by a prime mover, for example, one or more engines 24 via a gearbox 26. In some embodiments, the aircraft 10 further includes a translational thrust system 40 located at the extending tail 14 to provide translational thrust (forward or rearward) for the aircraft 10. The translational thrust system 40 includes a propeller 42 and is positioned at a tail section of the aircraft 10. Additionally, the aircraft 10 may include landing gear assemblies 35 extending from below the airframe 12. The illustrated aircraft 10 includes two front landing gear assemblies 35 (right landing gear not shown in FIG. 1) and a rear landing gear assembly 35. In some embodiments, the landing gear assemblies 35 may be retractable.

The main rotor assembly 18 includes an upper rotor assembly 28 driven in a first direction (e.g., counter-clockwise) about the main rotor axis, A, and a lower rotor assembly 32 driven in a second direction (e.g., clockwise) about the main rotor axis, A, opposite to the first direction (i.e., counter rotating rotors). Each of the upper rotor assembly 28 and the lower rotor assembly 32 includes a plurality of rotor blades 36 secured to a rotor hub 38. Any number of rotor blades 36 may be used with the main rotor assembly 18. The main rotor assembly 18 includes a rotor hub fairing 37 generally located between and around the upper and lower rotor assemblies such that the rotor hubs 38 are at least partially contained therein. The rotor hub fairing 37 provides drag reduction. Rotor blades 36 are connected to the upper and lower rotor hubs 38 in a hingeless manner, also referred to as a rigid rotor system. Although a particular aircraft configuration is illustrated in this non-limiting embodiment, other rotary-wing aircraft will also benefit from embodiments. Although, the dual rotor system is depicted as coaxial, embodiments include dual rotor aircraft having non-coaxial rotors. Further, a single rotor system could be used as well.

Figure 2:
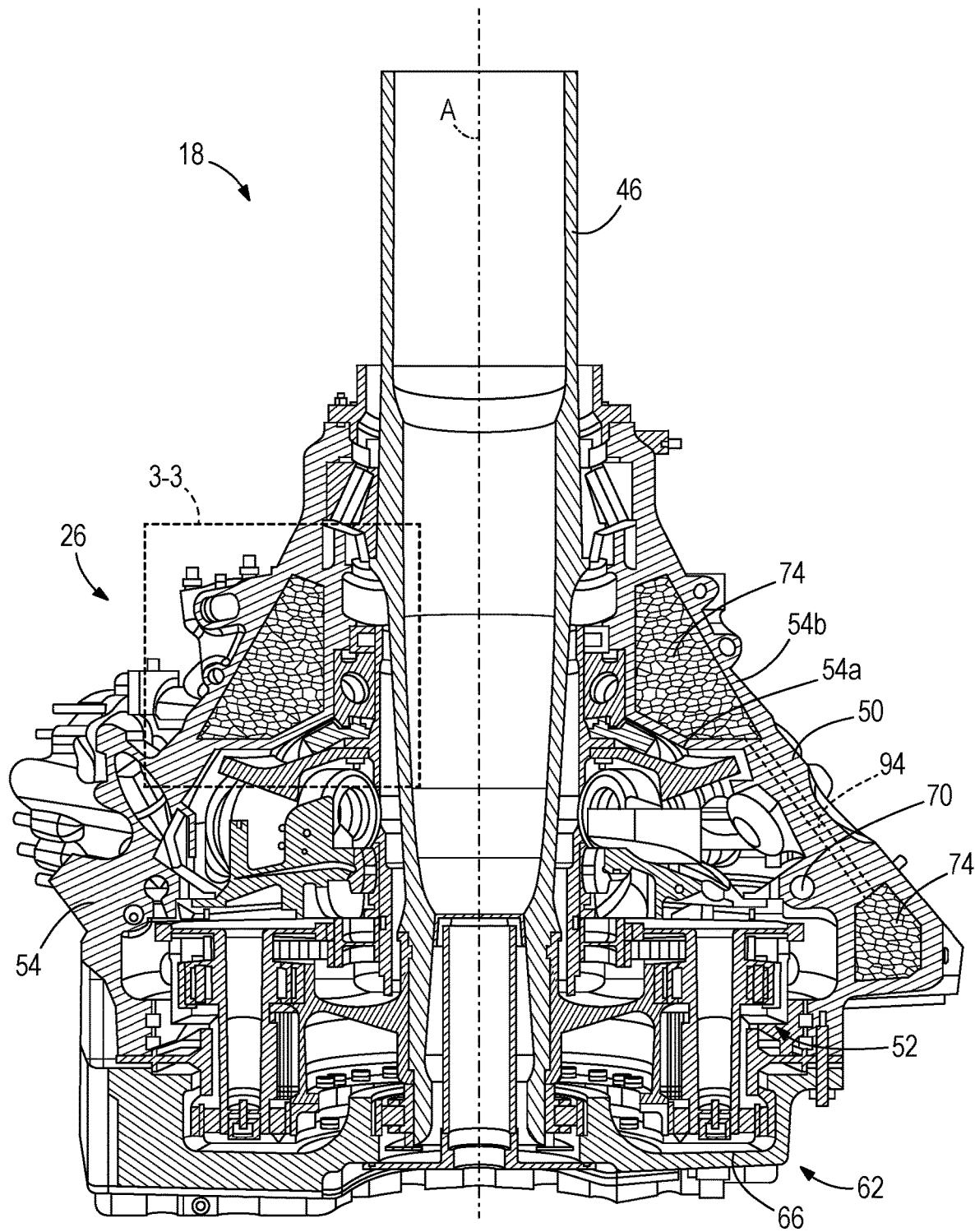
FIG. 2 is a cross-sectional view of a gearbox of a main rotor assembly of the aircraft of FIG. 1.

Referring to FIG. 2, the main rotor assembly 18 includes a main rotor shaft 46. The gearbox 26 includes a gearbox housing 50 and a transmission element 52 disposed within the gearbox housing 50. The transmission element 52 transmits torque from the one or more engines 24 to the main rotor shaft 46, such that the main rotor shaft 46 rotates about the main rotor axis A. The gearbox housing 50 includes walls 54, including both inner and outer walls, that define structure and cavities within the gearbox housing 50. The walls 54 of the gearbox housing 50 include an inner surface 54a that faces toward the transmission element 52 and an outer surface 54b opposite the inner surface 54a.

The gearbox 26 further includes a lubrication system 62 configured to supply lubricant to the transmission element 52 of the gearbox 26. The lubrication system 62 includes a sump 66 at a bottom of the gearbox housing 50. The sump 66 is configured to collect lubricant that falls from the transmission element 52 and functions as a main lubricant reservoir. The lubrication system 62 further includes conduits 70 for distributing lubricant from the sump 66 to the transmission element 52, as will be described in more detail below. In the illustrated embodiment, at least one conduit 70 is formed integrally with at least one wall 54 of the gearbox housing 50.

Figure 3A:
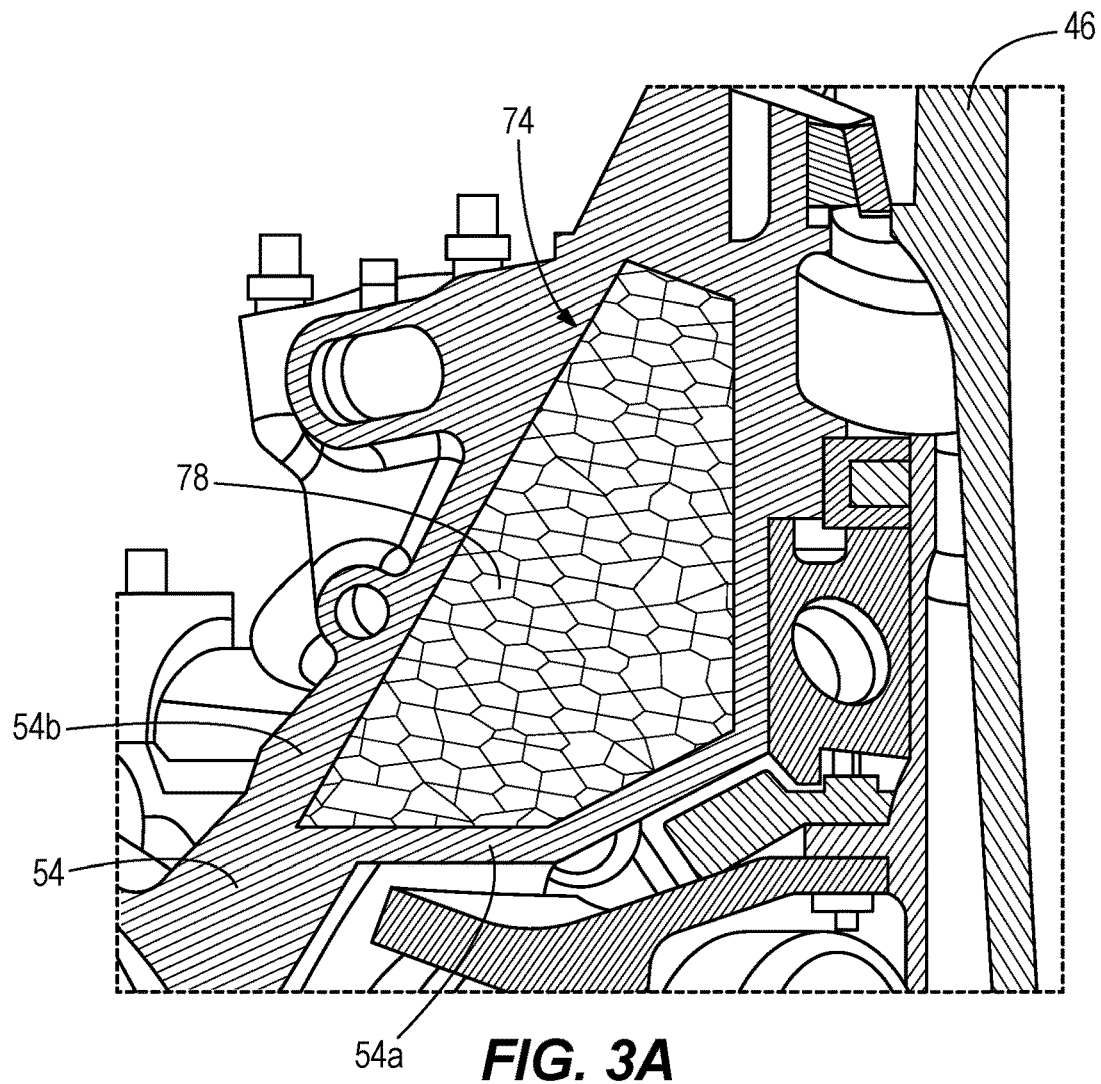
FIG. 3A is an enlarged cross-sectional view of portion 3-3 of the gearbox of FIG. 2.

With reference to FIGS. 2 and 3A, the lubrication system 62 further includes a semi-hollow volume 74 disposed within at least one wall 54 of the gearbox housing 50. In the illustrated embodiment, the semi-hollow volume 74 is disposed between the inner surface 54a and the outer surface 54b of one of the outer walls 54. In some embodiments, the semi-hollow volume 74 may be located alternatively or additionally within an inner wall 54 of the gearbox housing 50. The semi-hollow volume 74 is configured to store lubricant and functions as an auxiliary lubricant reservoir. In some embodiments, at least two walls 54 of the gearbox housing 50 may include semi-hollow volumes 74. In such embodiments, the semi-hollow volumes 74 may be interconnected via a channel or multiple channels to create a network of semi-hollow volumes 74. As such, lubricant can move freely between the at least two semi-hollow volumes 74 and redundancy in storage space is provided.

An internal structure 78 is formed within the semi-hollow volume 74 to provide structural support between the inner surface 54a and the outer surface 54b such that the hollow areas are reinforced with structure to provide sufficient strength and stiffness to the gearbox housing 50. Lubricant stored within the semi-hollow volume 74 can move freely around the internal structure 78. In the illustrated embodiment, the inner surface 54a, the outer surface 54b, and the internal structure 78 are integrally formed via 3D printing.

Figure 3B:
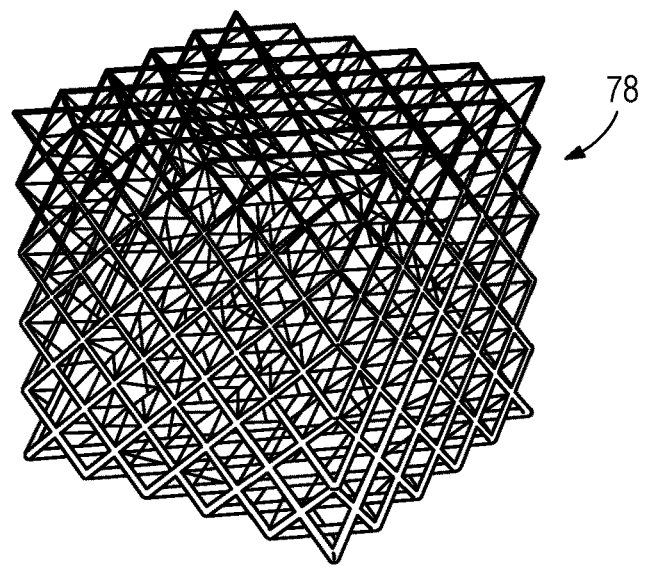
FIG. 3B is an enlarged view of an internal structure of a semi-hollow volume of the gearbox shown in FIG. 3A.

In the illustrated embodiment, the internal structure 78 is a lattice structure. In other words, the internal structure 78 is defined by a distinct, repeating pattern. The lattice structure may be, for example, a surface lattice, a strut lattice, or a planar lattice. Further, the lattice structure may be, for example, a simple cubic lattice, a body-centered cubic lattice, a face-centered cubic lattice, a gyroid lattice, or a hexagonal closest packed lattice. The lattice structure may also be a different type of lattice structure not mentioned herein. FIG. 3B illustrates one example of the internal structure 78 comprising a cubic lattice, which is an enlarged portion of the internal structure 78 formed in the semi-hollow volume 74 of the gearbox housing 50 shown in FIG. 3A. The internal structure 78 may also comprise more than one type of lattice structure within the semi-hollow volume 74. Furthermore, in other embodiments, the internal structure 78 may not be a lattice structure.

Accordingly, the internal structure 78 may be optimized to adequately suit the structural and volumetric requirements of the intended application. For example, the internal structure 78 is engineered to provide sufficient strength and stiffness to accommodate loads and stresses placed on the gearbox housing 50. In some embodiments, the semi-hollow volume 74 and internal structure 78 may be included in different or additional areas of the housing 50 depending on the housing design and where loads are carried. Further, within different parts of the housing 50, the internal structure 78 may comprise different shapes and sizes depending upon how much strength or stiffness is needed for certain parts of the housing 50.

Referring to FIGS. 4A and 4B, the lubrication system 62 further includes a plurality of jets 82a, 82b in fluid communication with the sump 66 via the conduits 70. A pump 86 is coupled between the sump 66 and the plurality of jets 82a, 82b and is configured to pump lubricant from the sump 66 to the jets 82a, 82b such that the jets 82a, 82b spray the lubricant. A first portion of the plurality of jets 82a are configured to spray lubricant directly onto the transmission element 52. A second portion of the plurality of jets 82b are configured to fill the semi-hollow volume 74 of the at least one walls 54 of the gearbox housing 50 with lubricant. In the illustrated embodiment, the inner surface 54a of the wall 54 includes a plurality of apertures 90 open to an interior of the gearbox housing 50 and in fluid communication with the semi-hollow volume 74 of the wall 54. In other embodiments, the apertures 90 may be provided on at least one inner wall 54. Lubricant flows freely from the semi-hollow volume 74 through the apertures 90, and onto the transmission element 52.

The semi-hollow volume 74 of the gearbox housing 50 advantageously allows the lubrication system 62 to function both during a normal operation and an emergency operation of the lubrication system 62. During normal operation, lubricant is supplied to the transmission element 52 via spraying from the first portion of the plurality of jets 82a and seeping from the semi-hollow volumes 74 through the apertures 90 of the wall inner surface 54a of the gearbox housing 50. During operation of the aircraft 10, a component of the lubrication system 62 may become damaged, resulting in decreased functionality of the lubrication system 62 (i.e., emergency operation). For example, the sump 66 may be damaged leading to a loss of lubricant, or the pump 86 may be damaged. Accordingly, during emergency operation, lubricant is no longer delivered to the transmission element 52 by the jets 82a, 82b.

Because the semi-hollow volume 74 of the gearbox housing 50 is constantly filled by the second portion of the jets 82*b* prior to the emergency operation, lubricant continues to be delivered to the transmission element 52 through the apertures 90 in the at least one wall 54. Therefore, the transmission element 52 will continue to be lubricated during emergency operation for a predetermined amount of time such that the aircraft 10 can safely land after sustaining damage. At least one aperture 90 of the gearbox housing 50 may be positioned adjacent a hot spot of the transmission element 52. In other words, at least one aperture 90 of the gearbox housing 50 may be positioned adjacent a component of the transmission element 52 that is prone to becoming excessively hot during operation of the aircraft 10. As such, components of the transmission element 52 that present the highest risk of overheating during emergency operation are prioritized for lubricant delivery. Advantageously, the gearbox housing 50 may act as a built-in heat exchanger with improved heat transfer capabilities due to the lubricant contained within the semi-hollow volume 74. In some embodiments, the semi-hollow volume 74 may be located adjacent hotspots of the transmission element 52 to strategically enhance thermal performance of the transmission element 52.

Various features and advantages are set forth in the following claims.

What is claimed is:

1. A gearbox comprising:
a housing defining an interior, the housing including outer walls and inner walls defining structure within the housing, wherein at least one wall of the housing includes a semi-hollow volume;
a main lubricant reservoir disposed within the interior of the housing; and
at least one pump arranged in the interior of the housing for pumping lubricant from the main lubricant reservoir and distributing the lubricant throughout the housing, lubricant is pumped through a first flow path to be directly distributed to a first location and a second flow path to be directly distributed to a second location different than the first location, wherein the first location is the interior of the housing and the second location is the semi-hollow volume of the at least one wall,
wherein the semi-hollow volume of the at least one wall is configured to store lubricant and function as an auxiliary lubricant reservoir during normal operation of the at least one pump, and further wherein when the main lubricant reservoir is damaged such that a loss of lubricant occurs within the housing, lubricant is configured to seep from the semi-hollow volume to distribute lubricant throughout the housing.

2. The gearbox of claim 1, wherein the semi-hollow volume of the at least one wall at least partially comprises a lattice structure.

3. The gearbox of claim 2, wherein the at least one wall and the lattice structure are integrally formed as a single structure.

4. The gearbox of claim 3, wherein the single structure is a 3D printed structure.

5. The gearbox of claim 2, wherein the lattice structure is a cubic lattice structure.

6. The gearbox of claim 1, wherein at least two walls of the housing include a semi-hollow volume, and the at least two walls are interconnected via a channel.

7. The gearbox of claim 1, wherein lubricant is configured to seep from the semi-hollow volume to distribute lubricant within the interior of the housing in the normal operation of the at least one pump.

8. The gearbox of claim 1, further including at least one jet fluidly connected to the at least one pump and configured to spray lubricant from the main lubricant reservoir into the housing.

9. The gearbox of claim 8, wherein the at least one jet sprays lubricant from the main lubricant reservoir into the housing in the normal operation of the at least one pump, and when the main lubricant reservoir is damaged such that loss of lubricant occurs, the at least one jet does not spray lubricant into the housing.

10. The gearbox of claim 8, further including a conduit that couples the main lubricant reservoir to the at least one jet, the conduit being formed integrally with at least one wall of the housing.

11. A lubrication system for a gearbox assembly, the lubrication system comprising:
a gearbox housing defining an interior, the gearbox housing including outer walls and inner walls defining structure within the gearbox housing, wherein at least one wall of the gearbox housing includes a semi-hollow volume, the gearbox housing further including a sump that stores lubricant and function as a main lubricant reservoir;
a transmission element disposed within the interior of the gearbox housing that receives and is lubricated by the lubricant;
wherein during normal operation of the lubrication system, lubricant is configured to be pumped from the sump and through a first flow path to be directly distributed to the transmission element, and lubricant is configured to be pumped through a second flow path to be directly distributed and stored in the semi-hollow volume of the at least one wall such that the semi-hollow volume is configured to function as an auxiliary lubricant reservoir, and
wherein during emergency operation of the lubrication system, lubricant is configured to seep from the semi-hollow volume to distribute lubricant to the transmission element.

12. The lubrication system of claim 11, wherein the semi-hollow volume includes an internal structure.

13. The lubrication system of claim 12, wherein the internal structure at least partially comprises a lattice structure.

14. The lubrication system of claim 11, wherein the at least one wall includes an aperture adjacent a hot spot of the transmission element, the aperture fluidly connected to the semi-hollow volume such that lubricant seeps through the aperture during emergency operation of the lubrication system.

15. The lubrication system of claim 11, wherein during normal operation of the lubrication system, lubricant is configured to seep from the semi-hollow volume to distribute lubricant to the gearbox housing.

16. An aircraft comprising:
a body;
a prime mover supported by the body;
a rotary assembly supported by the body;
a gearbox mechanically connected between the prime mover and the rotary assembly, the gearbox including,
a housing defining an interior, the housing including a plurality of walls, wherein at least one of the plurality of walls includes a semi-hollow volume;
a main lubricant reservoir; and
at least one pump arranged in the interior of the housing for pumping lubricant from the main lubricant reservoir and distributing lubricant throughout the housing, lubricant is pumped through a first flow path to be directly distributed to a first location and a second flow path to be directly distributed to a second location different than the first location, wherein the first location is the interior of the housing and second location is the the semi-hollow volume of the at least one wall, wherein the semi-hollow volume of the at least one wall is configured to store lubricant and function as an auxiliary lubricant reservoir during a normal operating condition of the at least one pump, and further wherein during an emergency operating condition, lubricant is configured to seep from the semi-hollow volume to distribute lubricant throughout the housing.

17. The aircraft of claim 16, wherein the semi-hollow volume of the at least one of the plurality of walls at least partially comprises a lattice structure.

18. The aircraft of claim 16, wherein the gearbox further includes at least one jet fluidly connected to the at least one pump and configured to spray lubricant from the main lubricant reservoir into the housing.

19. The aircraft of claim 16, wherein the gearbox further includes at least one jet fluidly connected to the at least one pump and configured to fill the semi-hollow volume with lubricant.

20. The aircraft of claim 16, wherein the main lubricant reservoir is damaged such that a loss of lubricant occurs within the housing in the emergency operating condition.

* * * * *